United States Patent Office 2,910,429
Patented Oct. 27, 1959

2,910,429

REACTIVATION OF PLATINUM CATALYSTS

Harry M. Brennan, Whiting, Roy W. Vander Haar, Highland, and Herman S. Seelig, Valparaiso, Ind., assignors to Standard Oil Company, Chicago, Ill., a corporation of Indiana No Drawing. Application July 30, 1954
Serial No. 446,948

11 Claims. (Cl. 208—140)

This invention relates to platinum catalysts, and more particularly to the reactivation of alumina-supported platinum catalysts after deactivation thereof in the conversion of hydrocarbons.

Within recent years, platinum catalysts have been prepared in forms suitable for a number of processes involving the high-temperature conversion of hydrocarbons. An especially successful example of this development has been the platinum hydroforming processes, employing platinum supported on various forms of alumina, with and without other components for reinforcing or modifying the catalyst activity. The new catalysts have proved to be of surprising ruggedness, particularly when protected against contamination by the known poisons for platinum, and when operated under carefully controlled temperature conditions in the presence of a substantial partial pressure of hydrogen. Sooner or later, however, platinum catalysts decline in activity below the level at which economic operation can be achieved, and must either be replaced or reactivated in some manner. The prior art has proposed a number of techniques in this connection, most of which are based upon a treatment with an oxygen-containing gas to remove carbon deposits therefrom and to reorient the active platinum centers in a manner not well understood. Certain embodiments of the oxidative regeneration technique are capable of restoring the catalyst to an activity approaching its original activity when freshly prepared; but this appears to be the best that can be achieved by such a method.

We have now discovered a new technique, involving a vapor-phase treatment with a volatile aluminum halide or other volatile aluminum compound, which is capable not only of restoring the activity of platinum-alumina catalysts, but is actually capable of raising the catalyst to an activity above its original level. It is accordingly an object of our invention to reactivate and to promote alumina-supported platinum catalysts, and thereby to effect an improvement in the conversion of hydrocarbons. These and other objects will be apparent from the following description of the invention.

In applying our invention, a platinum-alumina catalyst, after declining in activity to some degree during the conversion of hydrocarbons, is withdrawn from on-stream conditions, either by cessation of the conversion process and purging of reactants from the catalyst zone, or by physical withdrawal of the catalyst from the catalyst zone; and the catalyst is then exposed to contact with a volatile inorganic aluminum compound such as aluminum chloride, aluminum bromide, or aluminum iodide in the vapor phase at a temperature high enough to effect vaporization thereof and below about 1050° F., suitably above about 350° F., and preferably between about 400 and 950° F. A treating time of around 0.25 to 12 hours under these conditions is ordinarily sufficient to effect a complete restoration of the catalyst activity, at the end of which time it will generally be found that the catalyst has accumulated or retained between about 0.1 and 3 percent by weight of the volatile inorganic aluminum compound. The treating step can conveniently be carried out by volatilizing the inorganic aluminum compound and passing the vapors through the catalyst bed; or by passing a stream of hydrogen or an inert gas such as nitrogen or methane through or over a bed of anhydrous aluminum chloride (for example) at a temperature above about 350° F., under which conditions the aluminum chloride sublimes and is carried as a vapor by the gas stream into the catalyst zone; or the catalyst pellets can be commingled with the volatile inorganic aluminum compound and the mixture thereof heated to a temperature above the vaporization point of the aluminum compound; or the catalyst can be crushed, commingled with volatile inorganic aluminum compound, repelleted, and heated above the said volatilization temperature. Other techniques will be apparent to those skilled in the art.

After the treatment with the volatile aluminum compound has been completed, the catalyst can satisfactorily be returned immediately to the hydrocarbon conversion conditions. Before such return, however, we may optionally subject the catalyst to contact with an aqueous medium, such as water, aqueous ammonia, or preferably steam, in order to remove labile halogen therefrom. This treatment is also believed to effect a dissolving and redistribution of labile platinum compounds in the catalyst structure, and may in this way be of a material benefit in improving the catalyst properties. Steaming is suitably carried out at a temperature between about 700 and 1100° F. for a period of 2 to 12 hours, and the catalyst is thereafter in condition for immediate return to the hydrocarbon conversion process conditions. Washing with water is satisfactorily carried out at ordinary or elevated temperatures with from 1 to 5 volumes of water per volume of catalyst, preferably until soluble compounds have been largely removed. Washing with aqueous ammonium hydroxide can be carried out under substantially the same conditions, employing a solution containing from about 2 to 28 percent by weight of $NH_3$, and is ordinarily faster and more effective when it is desired to remove halogens. After treatment with a liquid-phase aqueous medium, the catalyst should be dried at 175 to 400° F. for a period of 4 to 24 hours, and should then be calcined in air, hydrogen, or inert gas at a temperature between about 800 and 1200° F. for around 2 to 12 hours or more. Finally, after any of the foregoing treatments, it is desirable to contact the catalyst with hydrogen or a hydrogen-containing gas at a temperature in or around the conversion range, or the said hydrogen treatment is achieved during the utilization of the catalyst at elevated temperatures in the hydrocarbon conversion process itself.

The treatment of the deactivated catalyst in accordance with our invention may optionally be preceded by a burn-off operation under mild conditions to remove carbon and organic residues from the catalyst particles. The carbon burn-off is suitably carried out with dilute oxygen (around 2 percent oxygen being preferred) at a temperature above about 800° F. and below about 1300° F., and the carbon content of the catalyst is ordinarily reduced below about 0.05 percent by weight in a contact time of around 1 to 24 hours.

As another alternative, prior to the treatment of the deactivated catalyst according to our invention, we may subject the catalyst to an oxidative rejuvenation treatment at elevated temperature, preferably at a temperature between about 950 and 1300° F., an oxygen partial pressure above about 0.4 atmosphere, and a contact time of around 15 minutes or more. Such a rejuvenation treatment should be carried out before the carbon level on the catalyst exceeds 0.1 percent by weight, or should be preceded by a carbon burn-off treatment under the conditions set forth above, in order to avoid localized overheating of the catalyst at the partial pressure of oxygen employed.

Our invention is useful in the treatment of the broad class of alumina-supported platinum catalysts, after deactivation thereof in a hydrocarbon-conversion process such as hydroforming. The alumina support is a hydrous solid, preferably eta-alumina or gamma-alumina, derived from alumina hydrosol, alumina hydrogel, alumina xerogel, alumina monohydrate, sintered alumina, or the like, all of which can be prepared according to methods described in the prior art. Into the alumina may be incorporated a mild cracking adjuvant or promotor if desired, such as chloride, fluoride, silica, boria, chromia, an oxide of phosphorus, or the like, suitably in the proportion between about 0.1 and 8 percent by weight, based on dry $Al_2O_3$. The alumina support should be substantially freed from soluble salts and other undesirable impurities by washing. The platinum can be added to the alumina in the form of a platinum compound such as chloroplatinic acid, platinum tetrachloride, or the like, or a solution thereof, or preferably a stable colloidal suspension or solution of a platinum sulfide, and the proportion of platinum in the completed catalyst should be between about 0.05 and 1 percent by weight of the alumina on a dry basis. The catalyst can be prepared in any desired mechanical form according to the specific process and equipment for which it is intended.

In a preferred embodiment of our invention, a cogelled platinum-alumina catalyst, after becoming deactivated in a hydroforming operation, is subjected to a mild oxidation with 2 percent oxygen in nitrogen at 900 to 1100° F. to remove carbon and organic materials therefrom, then optionally soaked at 950 to 1300° F. for 0.1 to 10 hours in an atmosphere containing oxygen at a partial pressure of 0.4 atmosphere or higher, contacted with a stream of hydrogen or inert gas containing vaporized aluminum chloride at 400 to 950° F. for 0.5 to 6 hours, and calcined in hydrogen at 800 to 1200° F. for 1 to 12 hours; thereafter it is returned to the hydroforming operation.

Our invention will be more fully understood from the following specific example.

A cogelled platinum-alumina catalyst containing 0.6 percent by weight of platinum, based on dry $Al_2O_3$, was employed in the hydroforming of a Mid-Continent virgin naphtha under conventional conditions for 360 hours, at the end of which time it had become carbonized and deactivated. The catalyst was then subjected to a simultaneous stripping and soaking in a recycle hydrogen stream at 950° F. and 200 pounds per square inch gage for 12 hours. Thereafter it was subjected to a mild oxidation with 2 percent oxygen in nitrogen, during which carbon and organic materials were burned therefrom in a combustion front which traversed the catalyst bed at a maximum temperature around 1050° F. The carbon-depleted catalyst was subjected to a series of oxidations and reductions, successively employing air at a pressure of 100 pounds per square inch gage and a temperature of 1050 to 1100° F. for 8 hours, then cylinder hydrogen at a pressure of 100 pounds per square inch gage and a temperature of 950° F. for 8 hours. The oxidized and reduced catalyst was cooled and divided into aliquots.

One aliquot of the oxidized and reduced catalyst, containing 0.38 percent by weight of chloride, was subjected to a standardized hydroforming test in a quasi-isothermal reaction tube surrounded by an electrically heated metal block for temperature control. The charging stock was a Mid-Continent virgin naphtha having an ASTM boiling range of 200–360° F., a CFR–R octane number of 44, a sulfur content of 0.03 percent, an API gravity of 56.5, a Reid vapor pressure of 1.8 pounds per square inch, a bromine number of 1.4, and a composition of 40 percent naphthenes, 52 percent paraffins, and 8 percent aromatics. The test was carried out at a block temperature of 940° F., a catalyst temperature of 920° F., a reactor pressure of 200 pounds per square inch, an hourly weight space velocity around 2, and a once-through hydrogen rate around 5,000 standard cubic feet per barrel of feed. The products were collected and analyzed with the following results:

| Product interval, hr. | Octane No., CFR-R | Relative activity |
| --- | --- | --- |
| 0–20 | 90.9 | 46 |
| 20–40 | 89.8 | |
| 40–60 | 89.7 | 34 |

The figures for relative activity given above are the volumes of an arbitrarily chosen standard catalyst, prepared by cogelation of platinum and alumina and containing 0.6 percent by weight of platinum, based on dry $Al_2O_3$, required to produce the same results as 100 volumes of the catalyst undergoing test.

Another aliquot of the oxidized and reduced catalyst was commingled with anhydrous aluminum chloride, heated to 950° F., held for one hour, and cooled. The treated catalyst, containing 0.63 percent by weight of chloride, was subjected to a standardized hydroforming test under the conditions defined above. The results demonstrate the striking effectiveness of our new technique in the reactivation and promotion of platinum-alumina catalysts:

| Product interval, hr. | Octane No., CFR-R | Relative activity |
| --- | --- | --- |
| 0–20 | 96.9 | 110 |
| 20–40 | 95.4 | 84 |
| 40–60 | 95.2 | 81 |
| 60–80 | 94.3 | 72 |
| 80–100 | 94.6 | 75 |

While we have described our invention with reference to certain specific embodiments, it is to be understood that such embodiments are illustrative only and not by way of limitation. Numerous additional embodiments of the invention and alternative manipulative techniques, process materials, and operating conditions will be apparent from the foregoing description to those skilled in the art.

In accordance with the foregoing description, we claim as our invention:

1. A method for reactivating a platinum-alumina catalyst after deactivation thereof by contact with a petroleum naphtha under hydroforming conditions, which comprises the steps of burning carbon from the said catalyst after withdrawing said catalyst from said hydroforming conditions, contacting the carbon-depleted catalyst at a temperature between about 350 and 1050° F. with a vapor stream containing a volatile aluminum halide for a period of at least about 0.25 hour, sufficient to deposit between about 0.1 and 3 percent by weight of said volatile aluminum halide on said catalyst, and thereafter contacting the said catalyst with a hydrogen-containing gas at a temperature within the hydroforming range.

2. A method for reactivating a platinum-alumina catalyst after deactivation thereof by exposure to a petroleum naphtha under hydroforming conditions, which comprises the steps of burning carbon from the said catalyst after withdrawing said catalyst from said hydroforming conditions, soaking the carbon-depleted catalyst at a temperature between about 950 and 1300° F. in an atmosphere containing oxygen at a partial pressure above about 0.4 atmosphere, contacting the oxygen-treated catalyst at a temperature between about 350 and 1050° F. with a volatile aluminum halide in the vapor phase for a period of about 0.25 to 12 hours, sufficient to deposit between about 0.1 and 3 percent by weight of said volatile aluminum halide on said catalyst, and thereafter contacting the said catalyst with a hydrogen-containing gas at a temperature within the hydroforming range.

3. A hydrocarbon conversion process which comprises the steps of contacting a hydrocarbon charging stock under conversion conditions with an alumina-supported platinum catalyst until said catalyst falls in activity substantially below its original level, withdrawing said catalyst from conversion conditions, exposing said catalyst to contact at a temperature between about 350 and 1050° F. with a volatile inorganic aluminum compound in the vapor phase for a period of about 0.25 to 12 hours, sufficient to deposit between about 0.1 and 3 percent by weight of said aluminum compound on said catalyst, whereby the activity thereof is substantially completely restored, and returning said catalyst to said hydrocarbon conversion process.

4. A hydroforming process which comprises the steps of contacting a petroleum naphtha under hydroforming conditions with a platinum-alumina catalyst until said catalyst falls in activity substantially below its original level, withdrawing said catalyst from hydroforming conditions, contacting said catalyst at a temperature between about 350 and 1050° F. with a vapor stream comprising a volatile aluminum halide for a period of about 0.25 to 12 hours, sufficient to deposit between about 0.1 and 3 percent by weight of said volatile aluminum halide on said catalyst, whereby the activity thereof is substantially completely restored, and returning said catalyst to said hydroforming process.

5. The process of claim 4 wherein said volatile aluminum halide is aluminum chloride.

6. In a hydrocarbon-conversion process wherein a hydrocarbon charging stock is contacted with an alumina-supported platinum catalyst under conversion conditions, and wherein said catalyst becomes deactivated during use in such process, the improvement which comprises discontinuing said hydrocarbon-conversion process after deactivation of said catalyst, exposing the deactivated catalyst to contact with a volatile inorganic aluminum compound in the vapor phase at a temperature above about 350° F. for a period of at least about 0.25 hour, whereby said catalyst is reactivated, and thereafter resuming said hydrocarbon-conversion process.

7. In a hydroforming process wherein a petroleum naphtha is contacted with a platinum-alumina catalyst under hydroforming conditions, and wherein said catalyst becomes deactivated during use in such process, the improvement which comprises discontinuing said hydroforming process after deactivation of said catalyst, contacting the deactivated catalyst at a temperature between about 350 and 1050° F. with a vapor stream comprising a volatile aluminum halide for a time sufficient to deposit between about 0.1 and 3 percent by weight of said volatile aluminum halide on said catalyst, whereby said catalyst is reactivated, and thereafter resuming said hydroforming process.

8. The process of claim 7 wherein said volatile aluminum halide is aluminum chloride.

9. The process of claim 7 wherein said contacting of said deactivated catalyst is carried out for a time between about 0.25 and 12 hours.

10. In a hydroforming process wherein a petroleum naphtha is contacted with a platinum-alumina catalyst under hydroforming conditions, and wherein said catalyst becomes deactivated during use in such process, the improvement which comprises discontinuing said hydroforming process after deactivation of said catalyst, contacting the deactivated catalyst at a temperature between about 350 and 1050° F. with a vapor stream comprising a volatile aluminum halide for a time sufficient to deposit between about 0.1 and 3 percent by weight of said volatile aluminum halide on said catalyst, treating said catalyst with an aqueous medium to remove labile halogen therefrom, whereby said catalyst is reactivated, and thereafter resuming said hydroforming process.

11. In a hydroforming process wherein a petroleum naphtha is contacted with a platinum-alumina catalyst under hydroforming conditions, and wherein said catalyst becomes deactivated during use in such process, the improvement which comprises discontinuing said hydroforming process after deactivation of said catalyst, contacting the deactivated catalyst with a vapor stream containing aluminum chloride at a temperature between about 400 and 950° F. for a period of about 0.25 to 12 hours, sufficient to deposit between about 0.1 and 3 percent by weight of aluminum chloride on said catalyst, steaming said catalyst at a temperature between about 700 and 1100° F. to remove labile chlorine therefrom, whereby said catalyst is reactivated, and thereafter resuming said hydroforming process.

References Cited in the file of this patent

UNITED STATES PATENTS

| | | |
|---|---|---|
| 2,582,428 | Haensel | Jan. 15, 1952 |
| 2,635,080 | Appell | Apr. 14, 1953 |
| 2,642,384 | Cox | June 16, 1953 |
| 2,737,475 | Voorhies | Mar. 6, 1956 |
| 2,746,937 | Hunter et al. | May 22, 1956 |

FOREIGN PATENTS

| | | |
|---|---|---|
| 20,915 | Great Britain | July 9, 1903 |